Patented Nov. 9, 1926.

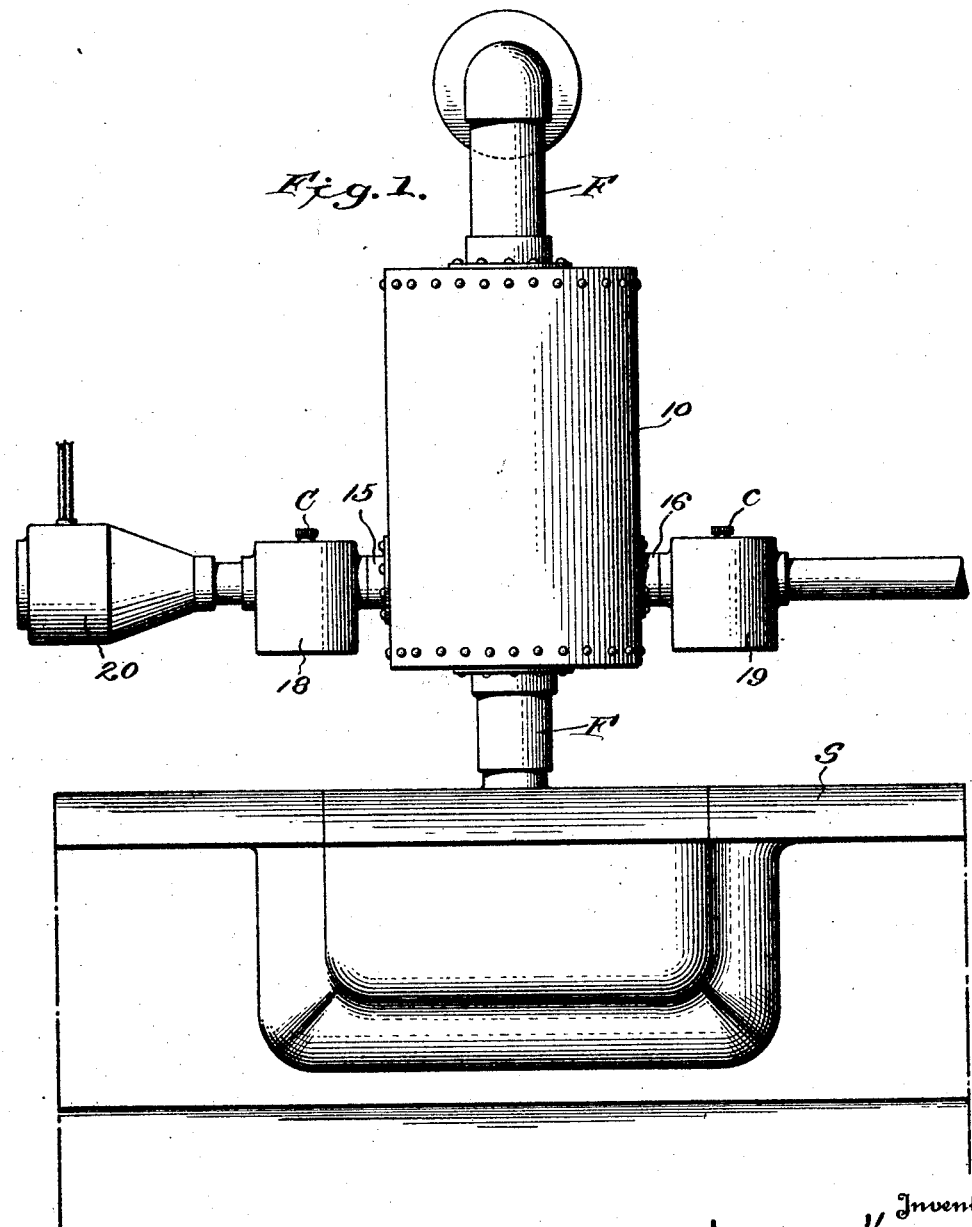

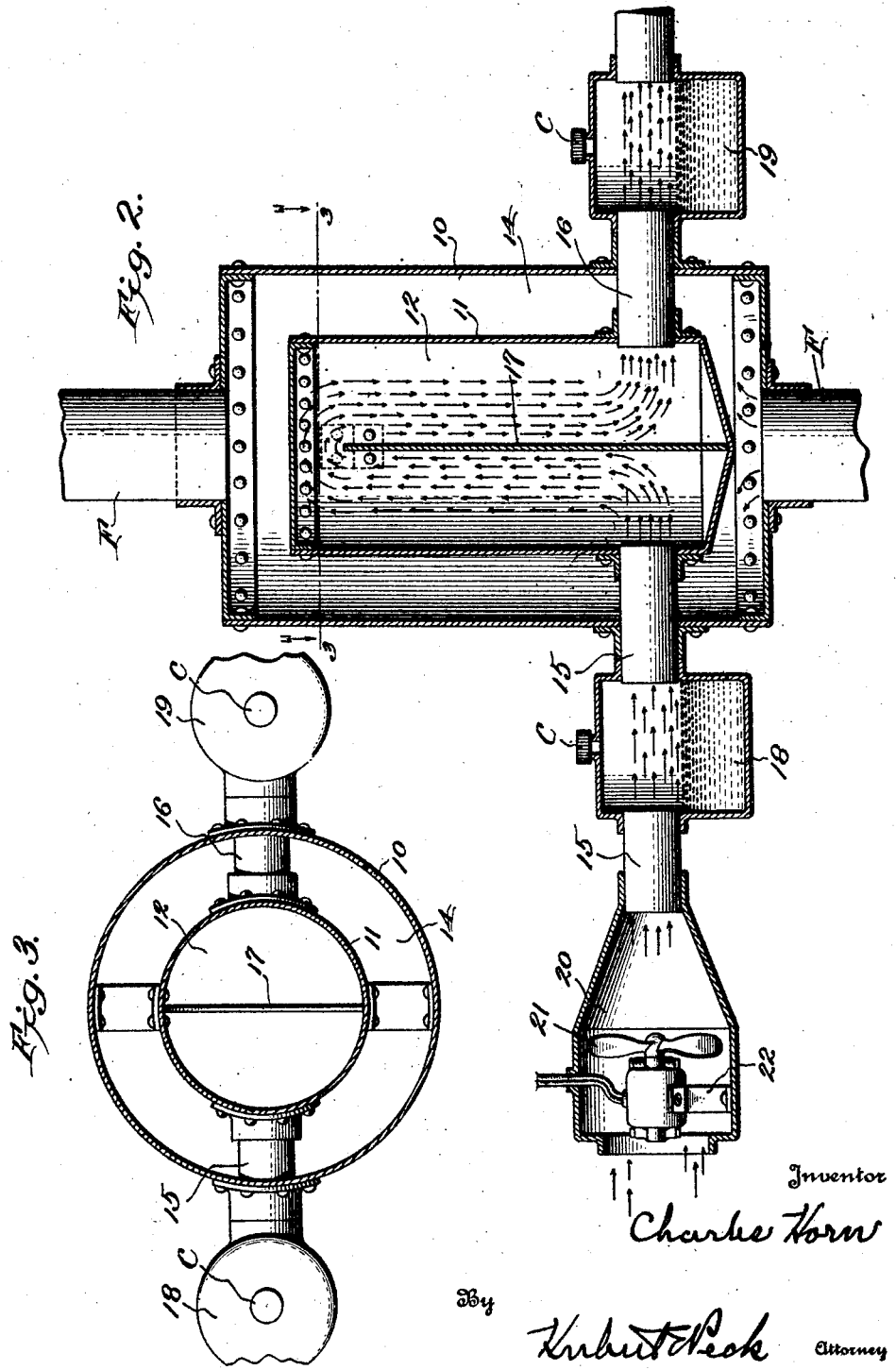

1,606,578

UNITED STATES PATENT OFFICE.

CHARLES HORN, OF BUTTE, MONTANA.

HEATING DRUM.

Application filed October 12, 1925. Serial No. 62,068.

This invention relates to certain improvements in heating drums; and the nature and objects of the invention will be readily recognized and understood by those skilled in the art in the light of the following explanation and detailed description of the accompanying drawings illustrating what I at present consider to be the preferred embodiments or mechanical expressions of the invention from among various other forms, arrangements, combinations and constructions of which the invention is capable within the spirit and scope thereof.

The invention is more particularly directed to the provision of an air heating drum adapted for connection to and operation with a cooking or kitchen stove or range, for supplying heated air to a building; and one of the objects of the invention is to provide a design and arrangement of heating drum in which fresh air is circulated in such a manner as to be quickly heated by the hot gases and products of combustion from the stove or range, and then discharged as heated air from the drum for distribution to the building to heat the same.

Another object of the invention resides in the provision in such a heating drum, for humidifying the heated air discharged from the drum into a building, so as to maintain the air in the building in a sanitary, healthy condition.

A further object of the invention is to provide an air heating drum of the type referred to with means for forcing the entry of fresh air therein and circulation of the fresh air therethrough for heating, so as to maintain a positive supply and flow of air into, through and from the drum.

A still further object of the invention is to provide an air heating and humidifying drum which is designed and constructed so as to be capable of operation as an air cooling and humidifying medium when the stove with which connected is not operated, and which is capable of such use without structural change or design reorganization.

Another object of the invention is to provide a construction of air heating or cooling drum in which positive and rapid circulation of air is secured in such a manner as to be subjected to the maximum effect of the heating or cooling medium.

With the foregoing general objects, and certain other objects and results in view, which other objects and results will be readily recognized and understood by those familiar with the art from the following description, the invention consists in certain novel features in construction and in combination and arrangement of elements, as will be more fully and particularly referred to and specified hereinafter.

Referring to the accompanying drawings in which similar reference characters refer to corresponding parts throughout the several figures:

Fig. 1 is an elevation of a heating drum of the invention connected with a cooking stove, a portion only of the stove being shown.

Fig. 2 is a vertical section through the heating drum of Fig. 1 showing the arrangement of intake and discharge conduits with the air forcing and humidifying elements in operative connection therewith.

Fig. 3 is a horizontal transverse section through the heating drum of Fig. 1, taken on line 3—3 of Fig. 2 above the air intake and discharge conduits therefor.

In the embodiment and arrangement of the invention disclosed herewith, purely by way of example and not of limitation, the heating drum is designed and adapted for connection with a stove or range of the cooking or kitchen type, although it is to be understood that the invention is equally adapted for use with any desired source of heat. In Fig. 1 of the accompanying drawings, a portion only of a stove S of the cooking or kitchen type is more or less diagrammatically illustrated, and includes the usual or any desired flue or smoke pipe F from the stove to a chimney or other discharge point for carrying off the gases and products of combustion from the stove and for creating and maintaining a draft through the combustion chamber thereof, as will be readily understood.

According to the illustrated example of one possible form of which the invention is capable, the heating drum 10 is mounted and connected in the flue or smoke pipe F at a point therein between the stove S and the connection of pipe F with the chimney or other discharge flue. Referring now to Fig. 2 of the drawings, the drum 10 is of cylindrical form, although not so limited, and is interposed in the pipe F as a part or continuation thereof, with the pipe F discharging from stove S through and into the lower end thereof, and the drum 10 discharging from and through its upper end into the upper or outer section of pipe F, so that the drum 10 forms an enlarged diameter section of pipe F and the hot gases and products of combustion pass therethrough from the stove.

Within and concentric with the drum 10, a closed cylinder 11 is mounted and forms an air heating chamber 12. The cylinder 11 is preferably, although not necessarily, constructed of copper, and in mounted position is spaced from the drum 10 on all sides so as to form the chamber or passage 14 around and completely surrounding the cylinder. At opposite sides of the cylinder 11 at the lower end thereof pipes or conduits 15 and 16 are connected in communication with the air heating chamber 12 thereof, and extending therefrom through the chamber 14 and outwardly through the sides of the drum 10. The conduit 15 forms the fresh air intake for the heating chamber 12, and the conduit 16 forms the heated air offtake or discharge from this chamber 12, as will be more fully explained hereinafter. A vertically disposed baffle plate or wall 17 is fixed in and extending centrally of the cylinder 11 from the lower end thereof upwardly therethrough to and terminating a distance inwardly from the upper or outer end thereof, and extending completely across the cylinder. This baffle plate 17 is mounted extending across the cylinder between the intake and dischage conduits 15 and 16, and divides the chamber 12 into two compartments with which the conduits respectively communicate, and which compartments are connected at the upper ends by the passage over the upper end of the baffle plate.

Water tanks or reservoirs 18 and 19 are connected in and form a part of the conduits 15 and 16, respectively, and extend or depend a distance below the conduits so as to be filled with water or any other desired material to a level of the conduits, to permit the air passing through the conduits to pass thereover and be subjected to the action thereof. The tanks 18 and 19 are provided with the usual or any desired filling openings closed by the removable caps or plugs C, as will be clear by reference to Fig. 2 of the accompanying drawings.

The fresh air intake conduit 15 is provided at its intake end with an enlarged funnel shaped casing or housing 20 forming the intake mouth therefor, and a suitable blower or fan 21, preferably of the electric motor driven type, is mounted in the casing 20 by any suitable standards or frame 22 (see Fig. 2). The blower or fan 21 is operated to draw fresh air into and force the same through conduit 15, into and through the air heating chamber 12 of cylinder 11.

The heating drum as above described is suitably connected in the flue or pipe F of the stove S, and the hot air discharge conduit 16 is connected with any desired arrangement of pipes (not shown) for conducting the hot air to the desired points of a building which it is desired to heat, as will be readily understood. In operation with a fire in the stove S, the hot gases and products of combustion pass from the stove S through pipe F and over and around the cylinder 11 in drum 10 through the chamber 14 therein and thoroughly heat the air in the heating chamber 12, the gases and products of combustion passing from drum 10 by flue F. The formation of the cylinder 11 of copper which is a good conductor of heat, assists in the rapid heating of the air in chamber 12. The blower or fan 21 is operated and draws or forces fresh, cool air through conduit 15 into the cylinder 11, where it passes upwardly over the baffle plate 17 and downwardly through the chamber 12, then outwardly through discharge conduit 16 for distribution. By the provision of the baffle plate 17 the air is caused to follow a tortuous passage through the cylinder 11 and is thus held therein a sufficient time to permit of its being thoroughly heated before discharge. The fan 21 maintains and forces circulation of air through the cylinder 11 and insures the rapid movement thereof, as well as sufficient quantities to result in the desired supply of hot air for heating purposes. The water in the reservoirs 18 and 19 over which the cool air passes in entering and the heated air passes in discharging from the drum, maintains the air in a moist, fresh condition so that the portions of the building heated thereby will be maintained in a healthy condition.

The invention further contemplates a use and operation thereof for cooling a building. When so operated, the stove or range S is not operated, and ice is packed into the tanks 18 and 19 so that the air is forced therethrough and thereover and is discharged by conduit 16 in a cool state. Obviously, ice or any other cooling medium can be placed at other locations to cool the air passing through the drum, for example, in the chamber 14 around the cylinder 11, and the invention contemplates and includes such location and operation.

With the heating drum of the invention, a kitchen range or cooking stove can be utilized to heat a house in an efficient manner, while operating for cooking purposes, and thus utilize what would be wasted heat. The heating drum can be used with any other desired source of heat for securing an efficient heating of air for any desired purpose, as will be recognized.

It is also evident that various modifications, variations, substitutions and changes might be resorted to without departing from the spirit and scope of my invention, and hence I do not wish to limit myself to the exact and specific disclosures hereof.

Desiring to protect my invention in the broadest manner legally possible, what I claim is:

An air heating drum formed with an inlet and a discharge for passing a heating medium therethrough, a closed cylinder mounted within said drum and spaced therefrom for passage of the heating medium thereover and therearound, an air inlet conduit extending through the drum and discharging into one end of the cylinder, an air discharge conduit leading from said drum opposite the inlet conduit, a baffle plate in the cylinder between and forming a tortuous air passage from the air inlet to the air discharge, and water reservoirs mounted in and connected with said inlet and discharge conduits for humidifying the air passing therethrough.

Signed at Butte, Montana, this 3 day of Oct., 1925.

CHAS. HORN.